UNITED STATES PATENT OFFICE.

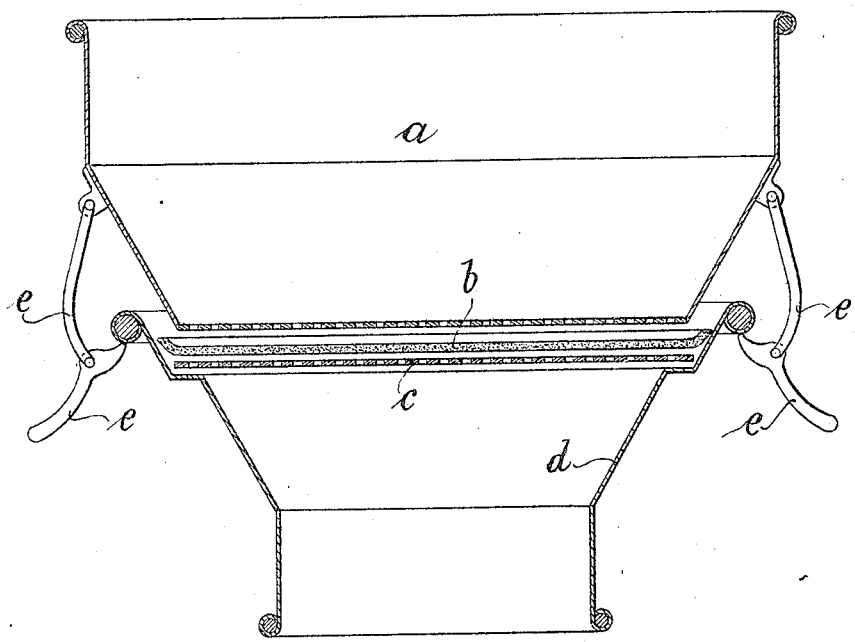
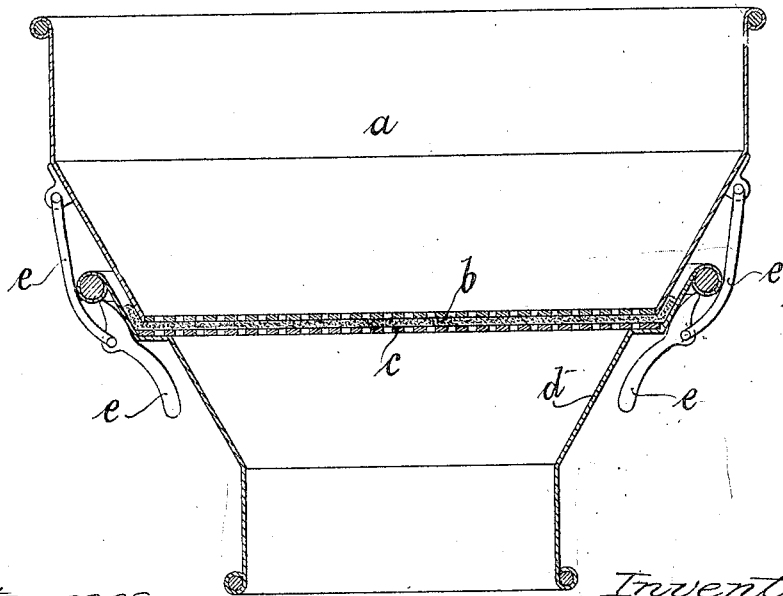

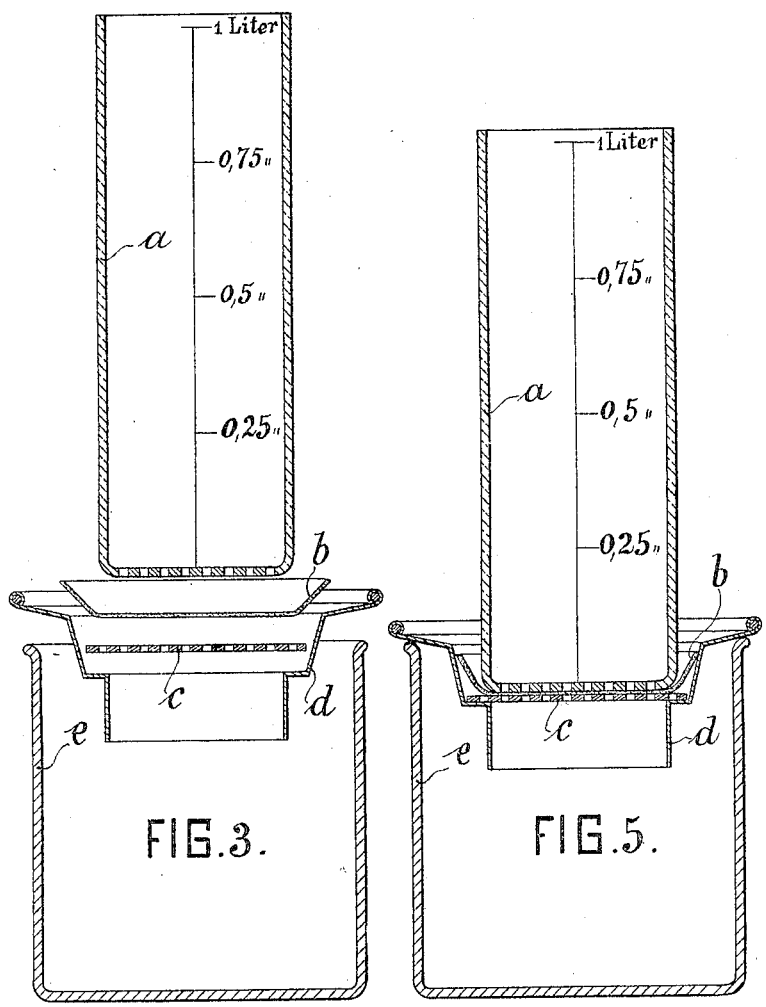
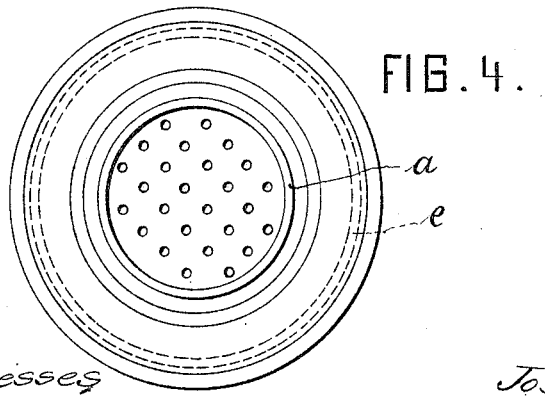

JOSEF FLIEGEL, OF MALLMITZ, GERMANY.

MILK-STRAINER WITH FILTER-PAD, &c.

No. 807,547.  Specification of Letters Patent.  Patented Dec. 19, 1905.

Application filed August 30, 1904. Serial No. 222,756.

*To all whom it may concern:*

Be it known that I, JOSEF FLIEGEL, a subject of the German Emperor, and a resident of Mallmitz, Silesia, in the Empire of Germany, have invented a certain new and useful Improved Milk-Strainer with Filter-Pad Pressed Between Sieves, of which the following is an exact, full, and clear description.

This invention relates to a filtering apparatus for straining milk and detecting particles of dirt therein. It is known to firmly compress filtering material between two sieves, such as wire-gauze sieves, whereby the portions of the filtering material are rendered immovable, the object being to restrict the free filtering-surface as little as possible by the superposed sieves, which for this purpose were formed of wire.

Assuming that the filtering material consists of a layer of wadding which is stretched between ordinary sieves, irregularities in the perviousness of the entire filtering-surface will be caused by the impressions of the narrow cross-pieces of the sieves—namely, partly by the defective arrangement of the latter and partly by the insufficient tension on the middle points of the surface situated apart from the fastening edge. Owing to this irregularity of the degree of perviousness, the partial filling of the filtering material with casein, which takes place during the filtering, could also not improve the filtering action. Moreover, since owing to a defective arrangement of the cross-pieces of the sieves, the fine fibers of wadding are not sufficiently retained, the liquid whirling around the cross-pieces may take irregular courses and force away the fibers. The reliable success of the filtration depends on the uniformity of the filtering action on all parts of the filter. These drawbacks are obviated by the present arrangement of the milk-filter, in that the elastic wire-gauze sieves are substituted by rigid sieve-plates dividing the total filtering-surface into smaller uniformly-acting filter-sections tightly inclosed by the covering-sections of the sieve-plates. By these means, in which the retention of the casein in the inclosed filter-sections or compartments plays an important part, a more effective filtration of the milk is obtained, and the new effect of the filtration of the milk—*i. e.*, the separation of even very finely divided particles of dirt—can only be attained by using filtering material of very fine texture, such as wadding. The layer of filtering material or wadding must not be too thick, in order that the filtration may not be impeded. The reliable success of the filtration depends on the uniformity of the filtering action on all parts of the filter. Assuming that the filtering material consists of a layer of wadding, which is stretched between ordinary sieves, irregularities in the perviousness of the entire filtering-surface will be caused by the impressions of the narrow cross-pieces of the sieves—namely, partly by the defective arrangement of the latter and partly by the insufficient tension on the middle points of the surface situated apart from the fastening edge. Owing to this irregularity of the degree of perviousness, the partial filling of the filtering material with casein, which takes place during the filtering, could also not improve the filtering action. Moreover, since owing to a defective arrangement of the cross-pieces of the sieves the fine fibers of wadding are not sufficiently retained, the liquid whirling around the cross-pieces may take irregular courses and force away the fibers.

According to the new arrangement of the sieve-filter small open filter sections or compartments are inclosed by solid portions of the sieve-plates, which are arranged closely upon the latter. The sieve-plates obviate any detrimental action of the covered filtering material, because at these covered parts the filtering material merely forms a packing intermediate layer. The smooth and preferably ground surfaces of the sieve-plates coöperate in such a manner that the filter-pad is uniform throughout, while each of the free filter-compartments on the sieve-openings offer the same filtering conditions and irregular straining is obviated. This uniformity of the conditions forms the basis for the suitable utilization of the casein in the milk. The casein can always be partly separated by mechanical means. This small quantity of casein which remains in the filtering material is sufficient for retaining the first portion of dirt, and the layer of mud produced retains still more dirt and casein, so that on an excessive continuation of the process the filter will become impervious. By retaining the fibers of wadding and maintaining the conditions of perviousness the new apparatus attains the desired successful action of a filter-pad, which is improved by the deposited casein.

The new apparatus, which also serves as a milk-testing appliance, is characterized by the insertion of the filter-plate between two rigid sieve-plates with only a sectional uncovering of the pervious intermediate layer in such a manner that the liquid cannot pass through the filter-plate and raise and move the single fibers thereof, but the fibers which are immovably secured in their position cause the liquid to only pass through the perforations presented by the sieve-openings, thus forming as many separate filters as there are sieve-openings.

The filtering apparatus shown in Figures 1 and 2 consists of the supply vessel $a$, to which the sieve-bottom is soldered, the wadding pad $b$, the loose sieve-bottom $c$, and the bottom part $d$. By means of the lever $e$, $a$ is pressed upon $b$, $c$, and $d$. Consequently the wadding $b$ is completely secured in all its smallest particles and the milk is prevented from passing through other unsuitable parts. A straining-cloth should preferably be stretched over the vessel $a$, so that the coarsest dirt will be retained there in order to obviate a premature obstruction of the wadding filter.

Now since any change of the milk by acidulation, boiling, and mixing boiled with raw milk, &c., always necessitates a change of the casein this change is also rendered necessary by filtering with the said filter. The contents of dirt or the state of the casein can also be ascertained by the speed at which the milk flows through the filter. Thoroughly-purified milk flows through the filter with almost the same speed as it is poured therein. Sour milk remains stationary at once and also very dirty milk. The speed test is more effective than the best analysis. It is thus possible when the milk is examined by the police authorities to ascertain in a few seconds with the new apparatus whether the milk is unwholesome or not. The dirt filtered from the milk is shown on the wadding pads exactly in the same direction as the sieve-plate. If the color of the plate is uniform on the entire surface, the tension of the wadding pad, and consequently the filtration, is insufficient. Pure milk and also the milk which has passed through the filter once are perfectly white after the filtration. Even a very small portion of dirt in the milk produces distinct brown spots on the wadding. If the sieve-plates are straight, it is not necessary to use the levers $e$, because the slight pressure of the supply vessel upon the wadding pad is sufficient.

In Figs. 3 and 4 the filter is shown as a dirt-testing apparatus. Fig. 3 is a vertical section, and Fig. 4 a plan, of the apparatus. $a$ is the supply vessel, made of glass and provided with perforated bottom. $b$ is the wadding pad, $c$ the bottom loose seive, and $d$ the bottom part. $e$ is a vessel placed underneath only for the sake of a better illustration.

Fig. 5 shows the dirt-testing apparatus in a combined form. The tester holds with his left hand the glass cylinder firmly upon the wadding pad and pours in with the other hand a liter of the milk to be tested. The speed at which the milk flows therethrough can be ascertained from the scale, while a glance at the wadding after the filtration will be sufficient to ascertain whether the milk contains dirt or is sour, &c.

Having now particularly described and ascertained the nature of my said invention and in what manner the same is to be performed, I declare that what I claim, and wish to secure by Letters Patent, is—

1. A milk-strainer comprising two perforated rigid plates and a filter-pad held firmly between the plates, the perforations in one plate being in alinement with those in the other plate.

2. A milk-strainer comprising two rigid perforated plates and a filter-pad between said plates and firmly pressed thereby said plates being so arranged that the pad is alternately exposed and covered so as to form free filtering-surfaces alternated by covered filtering-surfaces.

This specification signed and witnessed this 12th day of August, A. D. 1904.

JOSEF FLIEGEL.

In presence of—
 HENRY HASPER,
 WOLDEMAR HAUPT.